Jan. 21, 1969  R. L. POMEROY  3,422,914
FLEXIBLE DRILLSTEM
Filed May 5, 1966  Sheet 2 of 2
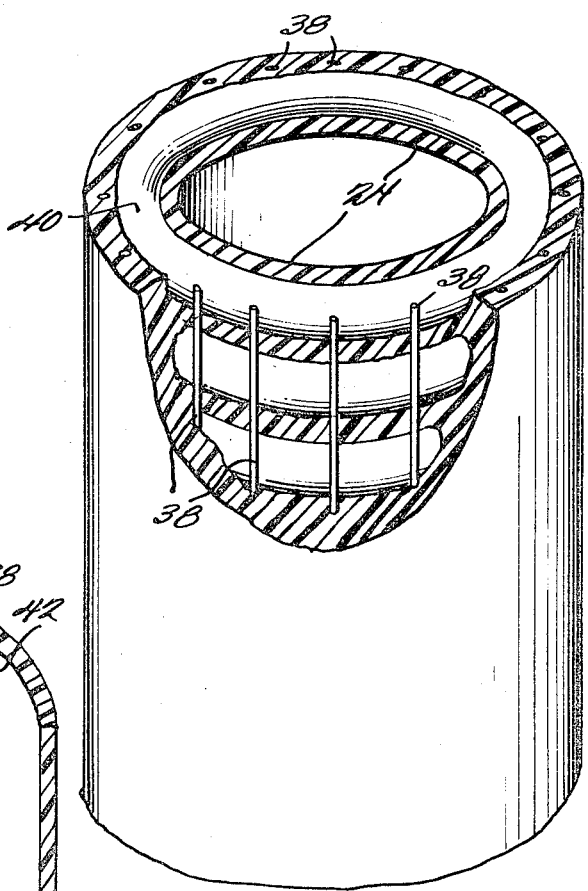
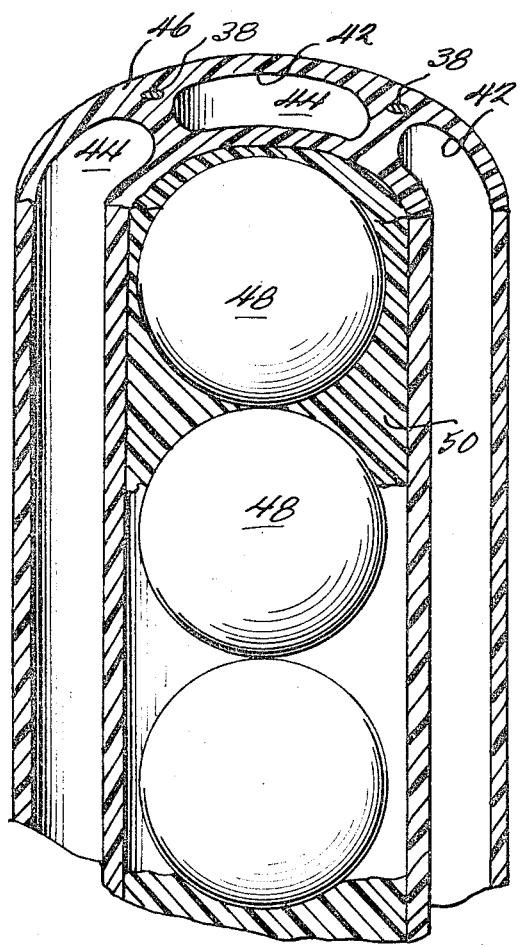
INVENTOR
ROBERT L. POMEROY
BY
ATTORNEYS United States Patent Office 3,422,914
Patented Jan. 21, 1969

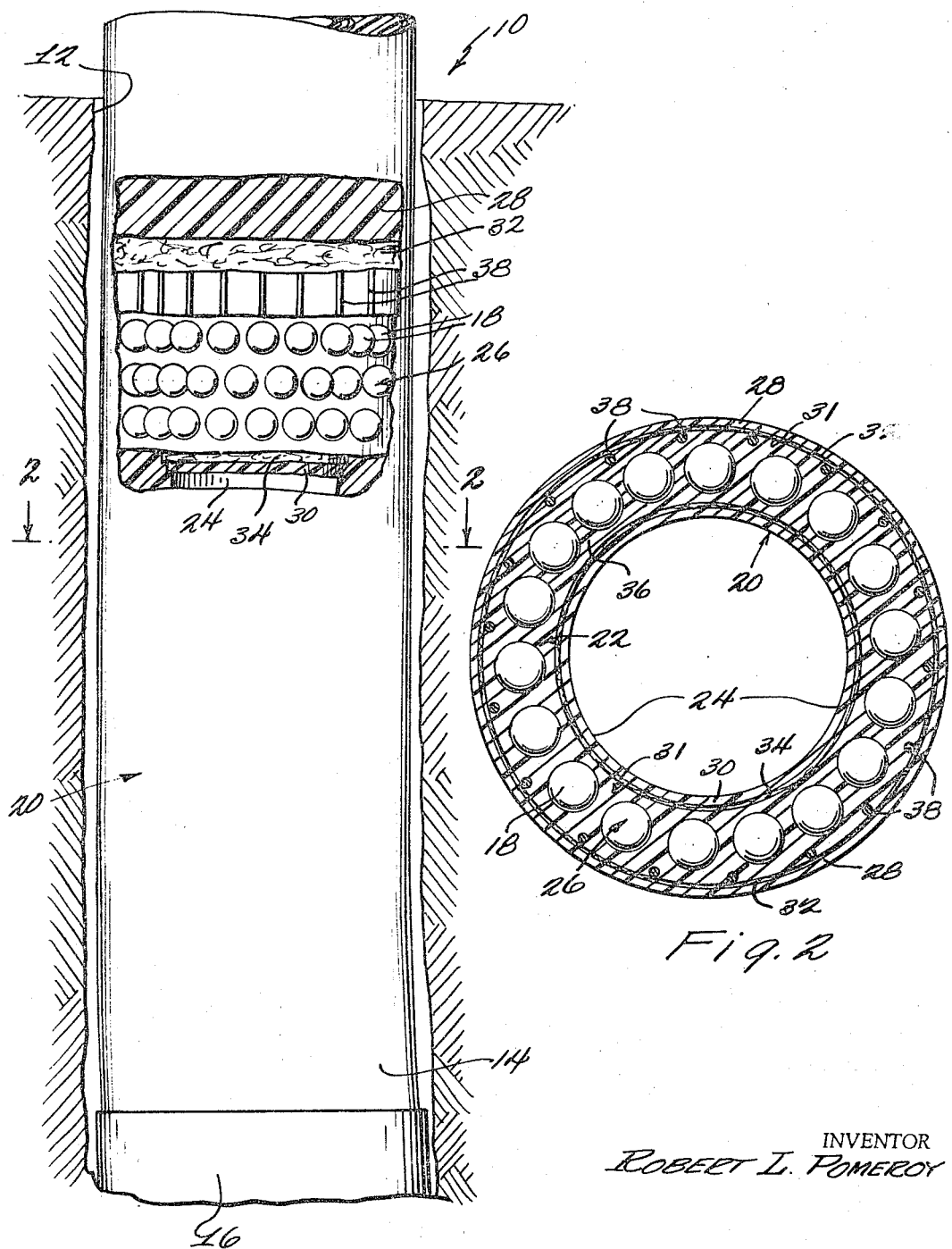

3,422,914
FLEXIBLE DRILLSTEM
Robert L. Pomeroy, Morlupo, Rome, Italy
Filed May 5, 1966, Ser. No. 547,892
U.S. Cl. 175—320         18 Claims
Int. Cl. E21b 17/00

ABSTRACT OF THE DISCLOSURE

A flexible drillstem including separate, embedded pressure-resistant flotation members providing an upward lift to the hose when immersed in drilling fluid.

BACKGROUND OF THE INVENTION

This invention relates to an oil well drilling apparatus and more particularly to a flexible drillstem.

In deep-well drilling, the drillstem has to perform a number of vital functions. It has to transmit power from the source on the surface to the cutting device at the bottom of the hole; it has to carry the drilling fluid or "mud" to cool and lubricate the bit, to maintain pressure on the walls of the well and to carry up the tailings; and it has to maintain pressure on the bit or cutting device. While the drillstem has other related functions, it will be appreciated that the above functions are the principal ones.

Operating at depths of 15,000 feet or more is common under present requirements of industry. At such depths there are naturally many problems concerned with strength of the drillstem and its own dead weight which must be sustained during drilling operations.

While rigid drillstems have the advantage of tremendous strength, they have the disadvantage of tremendous weight and lack of flexibility. On the other hand, flexible drillstems, per se, are old, but no flexible drillstem has ever been built to sustain its own dead weight at depths down to 15,000 feet or more.

Summary of the invention

The invention relates to a drillstem having a flexible hose with an interior passageway extending axially therethrough for accommodating the flow of drilling fluid, and pressure-resistant flotation elements embedded in the flexible hose for providing an upward lift to the hose when immersed in drilling fluid.

The present invention is not concerned with designing a stronger drillstem but rather is concerned with designing a flexible drillstem, the dead weight of which can be partially or completely sustained by the drilling fluid in which it is immersed. It will further be appreciated that the instant invention is concerned with substantially non-rotatable drillstems.

By including pressure resistant flotation elements within the walls of the hose comprising the drillstem, the drillstem can be designed to be weightless or at least substantially weightless in relation to the column of fluid in which it is suspended. The condition of "weightlessness" is determined not only by the weight and displacement of the hose and flotation elements, but also by the weight and displacement of the reinforcing cables, couplings, and the like. The weight of these latter elements must be sustained by the hose and flotation elements if the drillstem is to be completely "weightless." While the invention provides a drillstem in which the combined specific gravity of at least the flexible hose and flotation elements is less than the specific gravity of the drilling fluid, the specific gravity of the drillstem might be greater than that of the drilling fluid. Nevertheless, the principles of the invention could be employed for substantially reducing the weight of the drillstem which must be sustained by external means, although not completely eliminating the need for such external weight-sustaining means. It is contemplated that reinforcing cables, such as steel wires, could be imbedded in the wall structure of the hose between the flotation elements. These steel cables could be used not only for raising and lowering the drillstem and sustaining its "overweight" (i.e., that weight making the specific gravity of the drillstem greater than that of the drilling fluid), but also for transmitting electric power to the cutting device.

This improved flexible drillstem has numerous advantages including allowing continuous circulation of the drilling fluid and providing means by which power conductors and measurement and control conductors can be accommodated between the cutting device and the ground surface. Besides allowing deeper holes to be drilled, the improved drillstem results in a simplification of the hoisting problem, thereby allowing a reduction in manpower and operating time. Obviously, the saving in time for setting up and working the drilling system results in considerable economy. Furthermore, the reduction of weight on the bit enables the cutting device to rotate at higher speeds and enables greater precision control. Flexibility, versatility and rapid operation make the improved flexible drillstem particularly adaptable to marine drilling.

These and other objects of this invention are more clearly depicted in the following detailed description having specific reference to the attached drawings in which the embodiments of the invention are shown, not to limit the scope of the invention in any respect, but so that the principles thereof might be more clearly demonstrated.

Brief description of the drawings

FIGURE 1 is a fragmentary side elevational view of a section of the drillstem having parts broken away to disclose the interior thereof;

FIGURE 2 is a sectional view taken substantially along the lines 2—2 of FIGURE 1;

FIGURE 3 is a fragmentary perspective view of another embodiment of the invention with parts broken away for clarity; and FIGURE 4 is a fragmentary perspective sectional view of still another embodiment of the invention with parts broken away for clarity.

Description of the preferred embodiments

Referring now to the drawings, FIGURES 1 and 2 disclose the preferred embodiment of the invention. One section of the flexible drillstem 10 is shown partially received in the bored hole 12 in the ground. The ends 14 of each section of the drillstem include a coupling 16 which enables it to be rapidly and securely joined to the adjacent section. The drillstem is connected at one end to a rigid drillstem section, not shown, which supplies the necessary weight for the cutting bit, also not shown, and provides directional control for the entire drillstem.

Although the improved drillstem is not designed to be used in a rotary system, it is contemplated that torque-arrestors could be used to resist any rotation.

As specifically disclosed in FIGURES 1 and 2, the drillstem comprises a flexible hose 20 having wall structure 22 defining at least one interior passageway 24 extending axially or longitudinally of the hose through which drilling fluid can pass. Pressure resistant flotation elements 26 are imbedded and preferably completely enveloped within the wall structure 22 of the hose 20.

The primary object of the flotation elements is to provide "buoyancy" to the drillstem so that it will be weightless or self-sustained within the drilling fluid or at least sufficiently sustained to reduce considerably the dead weight of the drillstem. The use of the terms "buoyancy"

and "flotatable" is not intended to imply that the hose remains on or near the surface of the drilling fluid. When the hose is extended into the ground (generally in a substantially vertical position), the flotation elements add "buoyancy" or an upward force to the drillstem so that it partially or completely sustains its own weight.

The drilling fluid, which may comprise fresh water, salt water or some other fluid, determines an environment which has a certain specific gravity. In order to provide "buoyancy" to the drillstrem, the flotation elements must have a specific gravity less than the specific gravity of the drilling fluid so that if immersed in the drilling fluid by themselves, the flotation elements would float. When incorporated in the flexible hose, the flotation elements provide an upward, buoyant force on the drillstem which operates to sustain the weight of the drillstem.

The combined specific gravity of the hose and the flotation elements is less than the specific gravity of the drilling fluid so that the hose and flotation elements will be self-sustained within the drilling fluid, and prefererably the specific gravity of the drillstem (including the hose, flotation elements, couplings, cables, and the like) approximates that of the drilling fluid, although it could be greater or less than that of the drilling fluid. If the specific gravity of the drillstem is greater than the specific gravity of the drilling fluid, the total displacement effected by the drillstem in relation to its weight would reduce the total effective weight needed to be sustained by the drillstem itself.

Obviously, the hose could be made buoyant by disbursing a plurality of air pockets throughout the wall structure of the hose. However, when such a hose is lowered into a deep bore-hole, the walls of the hose would be flattened due to external pressure, and the hose would lose all its buoyancy. If the flotation elements are not pressure resistant, they would be flattened due to external pressure. Therefore, the instant invention provides for the use of pressure resistant flotation elements. A pressure resistant element is one which withstands normal operating pressures at the designed working levels. Thus, it is contemplated that the flotation elements should preferably withstand pressures up to 8,000 pounds per square inch or more.

The flotation elements are preferably made out of lightweight metals or alloys thereof, such as magnesium, magnesium alloys, aluminum, and aluminum alloys. These lightweight hollow metallic flotation elements are designed to withstand pressures up to and over 8,000 pounds per square inch. The flotation elements could take any desirable shape and could be provided with or without cavities. Within the scope of the invention, other materials having a specific gravity less than the specific gravity of the drilling fluid could be used, such as plastics, so long as their specific gravity remains less than that of the drilling fluid under the pressures specified. In this respect, these materials are considered pressure resistant even though they may not have cavities.

In the preferable embodiment of the invention, the flexible hose 20 has an outer layer 28 and an inner layer 30 (defining the passageway 24) made of a synthetic resinous material, such as thermosetting or thermoplastic resins including polypropylene, polyethylene, vinyls and the like. The interior surfaces 31 of the outer 28 and inner 30 layers are preferably bonded to reinforcing layers 32 and 34, respectively, made of fibres of the same material as the outer and inner layers or any other organic or inorganic fibrous material. Such organic fibrous material might include fibres fabricated from the thermoplastic and thermosetting resins identified above. Examples of inorganic fibres include glass fibres, silica fibres and the like.

A filler material 36 is received between the outer and inner double layers described above. This filler material could comprise a synthetic resinous material, such as the thermosetting and thermoplastic resins identified above, or even an organic or inorganic fibrous material. The flotation elements are preferably imbedded within the filler material and are preferably bonded thereto.

In order to provide electrical connections between the ground surface and the cutting mechanism and in order to provide reinforcing cables for sustaining and lifting the dead weight of the rigid drillstem section and cutting mechanism and the flexible-drillstem "over-weight," cables 38 are preferably imbedded within the wall structure 22 of the hose and extend axially of the hose. In the preferred embodiment of the invention, the cables 38 are made of wire ropes of high tensile strength steel (e.g., wire ropes being one-quarter inch in diameter and having a breaking strength of 2.74 tons each) circumferentially spaced within the filler material, as at a position adjacent to the outer layer of the hose. On the other hand, it might be preferable to incorporate the cable means as individual wires rather than as wire ropes.

As shown in FIGURES 1 and 2, the flotation elements 26 comprise pressure resistant spherical bodies 18 circumferentially arranged about the axial passageway 24 and within that portion of the hose comprising the filler material 36. FIGURE 3 discloses one modification of the design of the flotation elements. In this figure, the flotation elements comprise rings 40 which are pressure resistant and preferably tubular. These rings are imbedded within the filler material and encircle the axial passageway. The rings offer the advantage of having a greater ratio of volume displaced to weight of material than the same ratio found with spherical flotation elements.

FIGURE 4 discloses another embodiment of the invention in which the wall structure 22 includes an inner surface 42 defining a plurality of axial interior passageways 44 circumferentially spaced adjacent the outer wall 46 of the hose. The flotation elements in this embodiment comprise large pressure resistant spherical bodies 48 imbedded within the filler material 50 and positioned radially inwardly of the axial passageways 44. Thus, the filler material 50 and the large spherical bodies 48 form the solid core of the hose.

To illustrate the invention, a drillstem is provided having a hose with an outside diameter of 4.85" and an inside diameter of 3". The inner and outer layers of the hose are .10" in thickness and comprise polypropylene bonded to a reinforcing layer of polypropylene fibres. The inner and outer layers are bonded to flotation spheres by means of a polypropylene filler. The spheres are made of a high-strength magnesium-aluminum alloy with an outside diameter of .65" and a skin thickness of .025". This particular alloy is designed to withstand pressures of over 8,000 pounds per square inch. In this particular example there are seventeen courses of spheres per linear foot of drillstem with sixteen spheres to a circular course. Eight longitudinally or axially oriented wire ropes or cables of high-strength steel are imbedded in the wall of the hose, each wire rope or cable having a breaking stem of 2.74 tons. The following table gives the displacement and weight of the particular elements identified above per linear foot of drillstem:

| Material | Lbs. ea. | No. | Displacement (cu. in.) | Weight (lbs.) |
|---|---|---|---|---|
| Spheres | .003 ea. | 272 | 39 | .816 |
| Hose | .0324 p.c.i. | | 94 | 3.046 |
| ¼" wire rope | .1 per ft. | 8 | 3.8 | .8 |
| Total | | | 136.8 | 4.662 |

The following table gives the displacement and weight of various types of drilling fluid in which the drillstem might be immersed:

| Liquid | Lbs. p.c.i. | Displacement (cu. in) | Weight (lbs.) |
|---|---|---|---|
| Fresh water | .036 | 136.8 | 4.925 |
| Salt water | .037 | 136.8 | 5.062 |
| Drilling "mud" | .04 | 136.8 | 5.472 |

Accordingly, it will be seen that when the above drillstem is immersed in fresh water, salt water or drilling mud, it is supported with a positive buoyancy per linear foot of .263 pound, .40 pound, or .81 pound, respectively. Accordingly, at a depth of 15,000 feet, the positive buoyancy of the drillstem in fresh water, for instance, would be approximately 3900 pounds which should accommodate the added weight due to couplings and the like. If necessary, ballast can be added in the form of rigid drillstem sections in order to add additional weight to the cutting end of the drillstem.

It is estimated that the weight of the bit, cutting mechanism, torque-arrestor, and a section of rigid drillstem for direction control would not weigh over two tons. The eight wire ropes, with a breaking strength of 2.74 tons each, would have a total breaking strength of 21.92 tons or a safety factor of 10. Thus, with the flexible drillstem being substantially self-sustained, the cables can easily handle the dead weight of the rigid drillstem section and associated parts.

While the preferred forms of the invention have been illustrated in the drawings and discussed above, it should be adequately clear that considerable modification may be made thereto without department from the principles of the invention. Therefore, the foregoing should be considered in an illustrative sense rather than a limiting sense and accordingly the extent of this invention should be limited only by the spirit and scope of the claims appended hereto.

I claim:
1. A drillstem comprising:
   a flexible hose having wall structure defining at least one interior passageway extending axially of the hose through which drilling fluid can pass; and
   pressure resistant flotation members enveloped within the wall structure of the hose for providing an upward lift to the hose when immersed in drilling fluid, said flotation members comprising hollow pressure resistant spherical members.
2. The drillstem defined in claim 1 additionally comprising a plurality of cable means enveloped within the wall structure.
3. The drillstem defined in claim 1 wherein there are a plurality of interior passageways extending axially of the hose and circumferentially arranged within the hose defining therebetween the core of the hose and wherein the pressure resistant flotation members are received within the wall structure forming the core of the pipe and radially inwardly disposed from the passageways.
4. The drillstem defined in claim 1 wherein the wall structure comprises an outer and inner layer having a filler material received therebetween, the flotation members being positioned within the filler material.
5. The drillstem defined in claim 4 wherein the outer and inner layers comprise synthetic resinous material.
6. The drillstem defined in claim 5 wherein the synthetic resinous material comprises polypropylene.
7. The drillstem defined in claim 4 wherein the outer and inner layers comprise a first layer of synthetic resinous material and a second layer, bonded to the first layer, of organic fibrous material.
8. The drillstem defined in claim 4 wherein the outer and inner layers comprise a first layer of synthetic resinous material and a second layer, bonded to the first layer, of inorganic fibrous material.
9. The drillstem defined in claim 4 wherein the filler material comprises a synthetic resin.
10. The drillstem defined in claim 1 wherein the pressure resistant flotation members are made from a high-strength magnesium-aluminum alloy.
11. The drillstem defined in claim 10 wherein the high-strength magnesium-aluminum alloy is designed to withstand pressures of 8,000 pounds per square inch.
12. The drillstem defined in claim 1 wherein the wall structure comprises an outer and inner layer having a synthetic resinous filler material received therebetween, the outer and inner layers comprising a first layer of synthetic resinous material and a second layer, bonded to the first layer, of organic fibrous material; wherein the hollow spherical members are circumferentially spaced about the axial passageway and enveloped within the synthetic resinous filler material; including cable means enveloped within the filler material; and wherein the combined specific gravity of the wall structure, hollow spherical members, and cable means is less than the specific gravity of the drilling fluid.
13. The drillstem defined in claim 1 wherein the pressure resistant flotation members are made from a different material than that of the flexible hose.
14. A drillstem comprising:
   a flexible hose having wall structure defining at least one interior passageway extending axially of the hose through which drilling fluid can pass; and
   pressure resistant flotation members enveloped within the wall structure of the hose for providing an upward lift to the hose when immersed in drilling fluid, said flotation members comprising pressure resistant tubular rings enveloped within the wall structure and encircling the passageway.
15. The drillstem defined in claim 14 additionally comprising a plurality of cable means enveloped within the wall structure.
16. The drillstem defined in claim 14 wherein the wall structure comprises an outer and inner layer having a filler material received therebetween, the flotation members being positioned within the filler material.
17. The drillstem defined in claim 14 wherein the pressure resistant flotation members are made from a high-strength magnesium-aluminum alloy.
18. The drillstem defined in claim 14 wherein the pressure resistant flotation members are made from a different material than that of the flexible hose.

References Cited

UNITED STATES PATENTS

| | | | |
|---|---|---|---|
| 1,660,714 | 2/1928 | Lincoln | 166—243 |
| 2,198,016 | 4/1940 | Rogers | 175—320 X |
| 2,198,957 | 4/1940 | Watts | 166—243 |
| 2,301,783 | 11/1942 | Lee | 175—320 |
| 2,610,028 | 9/1952 | Smith | 166—243 X |
| 3,117,596 | 1/1964 | Kahn | 138—122 |
| 3,130,753 | 4/1964 | Monnen | 138—122 |
| 3,194,274 | 7/1965 | Griffiths | 138—125 X |

NILE C. BYERS, JR., *Primary Examiner.*